United States Patent
Eberlein et al.

(10) Patent No.: US 12,541,616 B2
(45) Date of Patent: Feb. 3, 2026

(54) DATA ACCESS CONTROL FOR DOMAIN SPECIFIC LARGE LANGUAGE MODEL SERVICES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 134 days.

(21) Appl. No.: 18/508,695

(22) Filed: Nov. 14, 2023

(65) Prior Publication Data

US 2025/0156574 A1    May 15, 2025

(51) Int. Cl.
*G06F 21/62* (2013.01)
*G06F 40/20* (2020.01)

(52) U.S. Cl.
CPC .......... *G06F 21/6227* (2013.01); *G06F 40/20* (2020.01)

(58) Field of Classification Search
None
See application file for complete search history.

(56) References Cited

U.S. PATENT DOCUMENTS

| | | |
|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,739,387 B2 | 6/2010 | Eberlein et al. |
| 8,126,919 B2 | 2/2012 | Eberlein |
| 8,225,303 B2 | 7/2012 | Wagner et al. |
| 8,291,038 B2 | 10/2012 | Driesen |
| 8,301,610 B2 | 10/2012 | Driesen et al. |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,479,187 B2 | 7/2013 | Driesen et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |
| 8,706,772 B2 | 4/2014 | Hartig et al. |
| 8,732,083 B2 | 5/2014 | Vasing et al. |

(Continued)

OTHER PUBLICATIONS

U.S. Appl. No. 16/688,941, Auer et al., filed Nov. 19, 2019.

(Continued)

*Primary Examiner* — Sanchit K Sarker
(74) *Attorney, Agent, or Firm* — Fish & Richardson P.C.

(57) ABSTRACT

The disclosure generally describes methods, software, and systems for to data access control for applications using large language models (LLM). A request to access attributes of an application object is received from a user. A LLM object access layer defining an access level of the user to each attribute of the application object is determined. The LLM object access layer is queried to determine accessible attributes of the attributes of the application object. A response is provided based on the accessible attributes of the application object to the user.

20 Claims, 6 Drawing Sheets

(56) References Cited

U.S. PATENT DOCUMENTS

| | | |
|---|---|---|
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,031,910 B2 | 5/2015 | Driesen |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,336,227 B2 | 5/2016 | Eberlein et al. |
| 9,348,929 B2 | 5/2016 | Eberlein |
| 9,354,860 B2 | 5/2016 | Eberlein et al. |
| 9,354,871 B2 | 5/2016 | Eberlein et al. |
| 9,361,093 B2 | 6/2016 | Meissner et al. |
| 9,367,199 B2 | 6/2016 | Klemenz et al. |
| 9,372,685 B1 | 6/2016 | Luettge et al. |
| 9,436,724 B2 | 9/2016 | Driesen et al. |
| 9,501,516 B2 | 11/2016 | Driesen |
| 9,519,675 B2 | 12/2016 | Specht et al. |
| 9,582,562 B2 | 2/2017 | Driesen et al. |
| 9,639,448 B2 | 5/2017 | Gebhard et al. |
| 9,652,214 B1 | 5/2017 | Eberlein |
| 9,652,744 B2 | 5/2017 | Eberlein et al. |
| 9,672,140 B1 | 6/2017 | Eberlein |
| 9,678,740 B2 | 6/2017 | Heine et al. |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,740,476 B2 | 8/2017 | Eberlein et al. |
| 9,767,424 B2 | 9/2017 | Biewald et al. |
| 9,800,689 B2 | 10/2017 | Said et al. |
| 9,830,138 B2 | 11/2017 | Said et al. |
| 9,836,299 B2 | 12/2017 | Eberlein et al. |
| 9,854,045 B2 | 12/2017 | Said et al. |
| 9,858,309 B2 | 1/2018 | Eberlein et al. |
| 9,875,273 B2 | 1/2018 | Eberlein et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 9,927,992 B2 | 3/2018 | Driesen et al. |
| 10,013,337 B2 | 7/2018 | Eberlein et al. |
| 10,055,215 B2 | 8/2018 | Specht et al. |
| 10,061,788 B2 | 8/2018 | Said et al. |
| 10,120,886 B2 | 11/2018 | Eberlein et al. |
| 10,157,052 B2 | 12/2018 | Eberlein et al. |
| 10,157,068 B2 | 12/2018 | Arians et al. |
| 10,185,552 B2 | 1/2019 | Eberlein et al. |
| 10,191,733 B2 | 1/2019 | Driesen et al. |
| 10,230,708 B2 | 3/2019 | Eberlein |
| 10,268,472 B2 | 4/2019 | Eberlein et al. |
| 10,268,692 B2 | 4/2019 | Mayer et al. |
| 10,270,743 B2 | 4/2019 | Eberlein |
| 10,291,704 B2 | 5/2019 | Eberlein et al. |
| 10,296,324 B2 | 5/2019 | Burkhardt et al. |
| 10,298,591 B2 | 5/2019 | Eberlein et al. |
| 10,303,665 B2 | 5/2019 | Engelko et al. |
| 10,417,205 B2 | 9/2019 | Specht et al. |
| 10,419,445 B2 | 9/2019 | Eberlein et al. |
| 10,437,795 B2 | 10/2019 | Eberlein et al. |
| 10,452,646 B2 | 10/2019 | Schlarb et al. |
| 10,482,080 B2 | 11/2019 | Auer et al. |
| 10,491,700 B2 | 11/2019 | Eberlein |
| 10,496,401 B2 | 12/2019 | Eberlein et al. |
| 10,505,832 B2 | 12/2019 | Eberlein et al. |
| 10,523,662 B2 | 12/2019 | Eberlein |
| 10,534,585 B1 | 1/2020 | Eberlein et al. |
| 10,536,461 B2 | 1/2020 | De Boer et al. |
| 10,621,167 B2 | 4/2020 | Auer et al. |
| 10,642,609 B1 | 5/2020 | Eberlein et al. |
| 10,656,933 B2 | 5/2020 | Radermacher et al. |
| 10,657,276 B2 | 5/2020 | Birn et al. |
| 10,659,449 B2 | 5/2020 | Eberlein |
| 10,673,962 B2 | 6/2020 | Mueller et al. |
| 10,684,999 B2 | 6/2020 | Mayer et al. |
| 10,685,007 B2 | 6/2020 | Eberlein et al. |
| 10,686,882 B2 | 6/2020 | Eberlein et al. |
| 10,693,989 B2 | 6/2020 | Eberlein et al. |
| 10,700,949 B1 | 6/2020 | Eberlein |
| 10,706,170 B2 | 7/2020 | Specht et al. |
| 10,713,277 B2 | 7/2020 | Auer et al. |
| 10,715,405 B2 | 7/2020 | Eberlein |
| 10,733,168 B2 | 8/2020 | Schlarb et al. |
| 10,740,315 B2 | 8/2020 | Birn et al. |
| 10,740,318 B2 | 8/2020 | Auer et al. |
| 10,762,075 B2 | 9/2020 | Eberlein et al. |
| 10,789,220 B2 | 9/2020 | Mayer et al. |
| 10,853,693 B2 | 12/2020 | Eberlein et al. |
| 10,871,962 B2 | 12/2020 | Burkhardt et al. |
| 10,891,217 B2 | 1/2021 | Eberlein et al. |
| 10,915,551 B2 | 2/2021 | Hauck et al. |
| 10,936,624 B2 | 3/2021 | Kruempelmann et al. |
| 10,942,892 B2 | 3/2021 | Driesen et al. |
| 10,956,150 B2 | 3/2021 | Eberlein et al. |
| 10,977,212 B2 | 4/2021 | Eberlein et al. |
| 10,983,762 B2 | 4/2021 | Eberlein et al. |
| 11,030,164 B2 | 6/2021 | Eberlein et al. |
| 11,036,754 B2 | 6/2021 | Specht et al. |
| 11,050,820 B2 | 6/2021 | Odenheimer et al. |
| 11,106,816 B2 | 8/2021 | Eberlein et al. |
| 11,119,883 B1 | 9/2021 | Eberlein et al. |
| 11,121,943 B2 | 9/2021 | Eberlein et al. |
| 11,153,394 B1 | 10/2021 | Eberlein et al. |
| 11,206,305 B1 | 12/2021 | Eberlein et al. |
| 11,218,388 B2 | 1/2022 | Eberlein |
| 11,232,126 B2 | 1/2022 | Meissner et al. |
| 11,237,821 B1 | 2/2022 | Hoeft et al. |
| 11,249,812 B2 | 2/2022 | Eberlein et al. |
| 11,269,620 B1 | 3/2022 | Hoeft et al. |
| 11,269,717 B2 | 3/2022 | Eberlein et al. |
| 11,310,328 B2 | 4/2022 | Eberlein |
| 11,347,873 B2 | 5/2022 | Eberlein |
| 11,354,302 B2 | 6/2022 | Eberlein et al. |
| 11,368,547 B2 | 6/2022 | Eberlein |
| 11,379,211 B2 | 7/2022 | Kruempelmann et al. |
| 11,379,217 B1 | 7/2022 | Eberlein et al. |
| 11,405,472 B2 | 8/2022 | Eberlein et al. |
| 11,409,719 B2 | 8/2022 | Eberlein |
| 11,418,550 B1 | 8/2022 | Eberlein et al. |
| 11,438,437 B1 | 9/2022 | Eberlein et al. |
| 11,451,537 B2 | 9/2022 | Eberlein |
| 11,463,309 B1 | 10/2022 | Eberlein et al. |
| 11,537,364 B2 | 12/2022 | Eberlein et al. |
| 11,551,141 B2 | 1/2023 | Driesen |
| 11,561,836 B2 | 1/2023 | Eberlein et al. |
| 11,561,956 B2 | 1/2023 | Auer et al. |
| 11,687,670 B2 | 6/2023 | Eberlein et al. |
| 11,693,945 B2 | 7/2023 | Engler et al. |
| 11,704,430 B2 | 7/2023 | Eberlein et al. |
| 11,720,342 B2 | 8/2023 | Eberlein et al. |
| 11,734,160 B2 | 8/2023 | Eberlein et al. |
| 11,797,879 B2 | 10/2023 | Eberlein et al. |
| 2009/0106371 A1 | 4/2009 | Schmidt-Karaca et al. |
| 2009/0106372 A1 | 4/2009 | Schmidt-Karaca et al. |
| 2009/0150479 A1 | 6/2009 | Eberlein et al. |
| 2009/0172110 A1 | 7/2009 | Eberlein et al. |
| 2011/0154445 A1 | 6/2011 | Schmidt-Karaca et al. |
| 2012/0136839 A1 | 5/2012 | Eberlein et al. |
| 2013/0085810 A1 | 4/2013 | Driesen et al. |
| 2013/0144918 A1 | 6/2013 | Said et al. |

(56) References Cited

U.S. PATENT DOCUMENTS

| | | |
|---|---|---|
| 2013/0166415 A1 | 6/2013 | Odenheimer et al. |
| 2013/0166416 A1 | 6/2013 | Eberlein |
| 2013/0324201 A1 | 12/2013 | Eberlein et al. |
| 2013/0325672 A1 | 12/2013 | Odenheimer et al. |
| 2013/0339488 A1 | 12/2013 | Eberlein et al. |
| 2014/0019429 A1 | 1/2014 | Driesen et al. |
| 2014/0025441 A1 | 1/2014 | Eberlein et al. |
| 2014/0047319 A1 | 2/2014 | Eberlein |
| 2014/0149158 A1 | 5/2014 | Odenheimer et al. |
| 2014/0164963 A1 | 6/2014 | Klemenz et al. |
| 2014/0372981 A1 | 12/2014 | Said et al. |
| 2015/0188890 A1 | 7/2015 | Said et al. |
| 2015/0220576 A1 | 8/2015 | Eberlein |
| 2015/0222665 A1 | 8/2015 | Eberlein et al. |
| 2016/0026698 A1 | 1/2016 | Eberlein et al. |
| 2016/0063050 A1 | 3/2016 | Schoen et al. |
| 2016/0098253 A1 | 4/2016 | Hutzel et al. |
| 2016/0127325 A1 | 5/2016 | Odenheimer et al. |
| 2017/0161291 A1 | 6/2017 | Specht et al. |
| 2017/0161511 A1 | 6/2017 | Eberlein et al. |
| 2017/0171233 A1 | 6/2017 | Odenheimer et al. |
| 2017/0329505 A1 | 11/2017 | Richter et al. |
| 2018/0041568 A1 | 2/2018 | Eberlein |
| 2018/0121236 A1 | 5/2018 | Odenheimer et al. |
| 2018/0300332 A1 | 10/2018 | Odenheimer et al. |
| 2019/0005260 A1* | 1/2019 | Qiu .................... G06F 21/6218 |
| 2019/0129997 A1 | 5/2019 | Auer et al. |
| 2019/0340260 A1 | 11/2019 | Eberlein et al. |
| 2019/0340282 A1 | 11/2019 | Zimmermann et al. |
| 2020/0175336 A1 | 6/2020 | Eberlein et al. |
| 2020/0183812 A1 | 6/2020 | Eberlein et al. |
| 2020/0195527 A1 | 6/2020 | Eberlein |
| 2020/0225940 A1 | 7/2020 | Eberlein et al. |
| 2020/0304385 A1 | 9/2020 | Eberlein |
| 2020/0351367 A1 | 11/2020 | Eberlein |
| 2020/0364604 A1 | 11/2020 | Eberlein et al. |
| 2021/0073411 A1 | 3/2021 | Eberlein et al. |
| 2021/0182108 A1 | 6/2021 | Eberlein et al. |
| 2021/0182251 A1 | 6/2021 | Eberlein et al. |
| 2021/0385136 A1 | 12/2021 | Misch et al. |
| 2022/0108206 A1 | 4/2022 | Driesen et al. |
| 2022/0217208 A1 | 7/2022 | Eberlein et al. |
| 2022/0292420 A1 | 9/2022 | Eberlein et al. |
| 2022/0300490 A1 | 9/2022 | Eberlein et al. |
| 2022/0335031 A1 | 10/2022 | Eberlein et al. |
| 2022/0391305 A1 | 12/2022 | Eberlein et al. |
| 2022/0398258 A1 | 12/2022 | Eberlein et al. |
| 2023/0019160 A1 | 1/2023 | Eberlein |
| 2023/0041514 A1 | 2/2023 | Eberlein et al. |
| 2023/0068439 A1 | 3/2023 | Hoeft et al. |
| 2023/0119834 A1 | 4/2023 | Driesen |
| 2023/0169528 A1 | 6/2023 | Eberlein et al. |
| 2023/0195422 A1 | 6/2023 | Eberlein et al. |
| 2023/0252009 A1 | 8/2023 | Hauck et al. |
| 2023/0315723 A1 | 10/2023 | Eberlein et al. |
| 2023/0325377 A1 | 10/2023 | Eberlein et al. |
| 2024/0419465 A1* | 12/2024 | Riscutia ................ G06F 40/166 |
| 2025/0061307 A1* | 2/2025 | Tran ...................... G06N 3/045 |
| 2025/0086467 A1* | 3/2025 | Yee ...................... G06N 3/0475 |
| 2025/0148084 A1* | 5/2025 | Foulon ................. G06F 21/577 |

OTHER PUBLICATIONS

U.S. Appl. No. 17/938,101, Eberlein et al., filed Oct. 5, 2022.
U.S. Appl. No. 17/979,423, Eberlein et al., filed Nov. 2, 2022.
U.S. Appl. No. 17/983,045, Eberlein, filed Nov. 8, 2022.
U.S. Appl. No. 18/048,578, Eberlein et al., filed Oct. 21, 2022.
U.S. Appl. No. 18/191,343, Eberlein et al., filed Mar. 28, 2023.
U.S. Appl. No. 18/209,234, Eberlein, filed Jun. 13, 2023.
U.S. Appl. No. 18/242,103, Nutakki et al., filed Sep. 5, 2023.
U.S. Appl. No. 18/298,634, Eberlein et al., filed Apr. 11, 2023.
U.S. Appl. No. 18/298,661, Eberlein, filed Apr. 11, 2023.
U.S. Appl. No. 18/327,370, Eberlein et al., filed Jun. 1, 2023.
U.S. Appl. No. 18/488,159, Eberlein et al., filed Oct. 17, 2023.
U.S. Appl. No. 18/491,350, Eberlein et al., filed Oct. 20, 2023.
U.S. Appl. No. 18/498,674, Eberlein et al., filed Oct. 31, 2023.
U.S. Appl. No. 18/508,705, Eberlein et al., filed Nov. 14, 2023.
U.S. Appl. No. 18/508,714, Eberlein, filed Nov. 14, 2023.
Extended European Search Report in European Appln. No. 24206364. 2, mailed on Feb. 27, 2025, 9 pages.
Techcommunity.microsoft.com [online], "Access Control in Generative AI Applications with Azure AI Search" Oct. 18, 2023, retrieved on Feb. 26, 2025, retrieved from URL <https://techcommunity. microsoft.com/blog/azure-ai-services-blog/access-control-in-generative-ai-applications-with-azure-ai-search/3956408>, 11 pages.
Zafar et al., "Building Trust in Conversational AI: A Comprehensive Review and Solution Architecture for Explainable, Privacy-Aware Systems using LLMs and Knowledge Graph" CoRR, Submitted on Aug. 2023, arXiv:2308.13534v1, 15 pages.

* cited by examiner

DATA ACCESS CONTROL FOR DOMAIN SPECIFIC LARGE LANGUAGE MODEL SERVICES

TECHNICAL FIELD

The present disclosure generally relates to large language models (LLMs) and more specifically to data access control for large language model services.

BACKGROUND

LLMs can be trained to perform a variety of domain tailored services. For example, an application with many data domains can use multiple specialized LLMs with heterogeneous privacy commitments for executing the domain tailored services. The LLMs cannot be statically implemented but can be configurable and extensible by customers. Generating specialized LLMs can include implementing domain specific configurations and adjusting the LLMs to minimize the errors present in the output of the LLMs. For instance, configuring LLMs can include adjusting models according to different data requirements and privacy commitments. Domain specific LLMs are expected to evolve, requiring continuous adjustments.

SUMMARY

Implementations of the present disclosure are directed to large language model (LLM) services. More particularly, implementations of the present disclosure are directed to data access control for applications using LLMs for generative artificial intelligence.

In some implementations, a method includes: receiving, by one or more processors from a user, a request to access attributes of an application object, determining, by the one or more processors, a large language model (LLM) object access layer defining an access level of the user to each attribute of the application object, querying, by the one or more processors, the LLM object access layer, to determine accessible attributes of the attributes of the application object, and providing, by the one or more processors, a response based on the accessible attributes of the application object to the user.

The foregoing and other implementations can each optionally include one or more of the following features, alone or in combination. In particular, implementations can include all the following features:

In a first aspect, combinable with any of the previous aspects, wherein the LLM object access layer includes a filter configured to determine the accessible attributes using a filter configuration. In another aspect, the LLM object access layer accesses a prompt generator to create a content for prompts sent to an external LLM to retrieve the accessible attributes. In another aspect, the computer-implemented method further includes interpreting, by the one or more processors, a question, using an application logic, to determine a context of the question. In another aspect, the computer-implemented method further includes determining a domain of an LLM configured to access the accessible attributes is based on processing the context of the question. In another aspect, the computer-implemented method further includes applying, by the one or more processors, a filtering configuration corresponding to the context of the question. In another aspect, the computer-implemented method further includes generating, by the one or more processors, an entry in an access log indicating the accessible attributes determined for the context of the question. In another aspect, the computer-implemented method further includes LLM includes a lifecycle including time varying terms and conditions. In another aspect, the computer-implemented method further includes determining, by the one or more processors, an action to be executed in response to determining the accessible attributes. In another aspect, the application object includes object nodes, each node including one or more attributes.

Other implementations of the aspect include corresponding systems, apparatus, and computer programs, configured to perform the actions of the methods, encoded on computer storage devices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

Implementations described in the present disclosure, provide access to application data by LLMs in a transparent way. Configurations can be pre-defined by users (software vendors), and are changeable by the users of the application, without modifications to application code. An advantage of the described technology is that it provides user access rights for database objects or by creating projection views or other data access control techniques. Configurations can be defined per application object or database table. The configurations can be re-usable for access by many LLMs, but the configuration can be adjusted to particular LLMs to increase an output accuracy. The described technology can case access management and reduce storage costs for maintenance in case LLM terms and conditions change. Furthermore, the described data access control approach allows logging access by LLM to granted data and blocked access attempts. Another advantage of the described technology is that the described logging access allows users (e.g., developers) to optimize access settings, to optimize LLM use, or to optimize other aspects of the application with superior insight into actual access statistics in production use.

The details of one or more implementations of the subject matter of the specification are set forth in the accompanying drawings and the description below. Other features, aspects, and advantages of the subject matter can become apparent from the description, the drawings, and the claims.

DESCRIPTION OF THE DRAWINGS

The accompanying drawings, which are incorporated in and constitute a part of this specification, show particular aspects of the subject matter disclosed herein and, together with the description, help explain some of the principles associated with the disclosed implementations. In the drawings.

When practical, like labels are used to refer to same or similar items in the drawings.

DETAILED DESCRIPTION

Implementations of the present disclosure are directed to techniques and tools for large language models (LLMs). More particularly, implementations of the present disclosure are directed to applications using LLMs for generative artificial intelligence (AI), the applications being deployed "on-premise" or being provided "as a service." The described implementations provide access to attributes of an application LLM object, according to user access levels and privacy demands for each attribute of the application object. An LLM object access layer can be queried to determine accessible attributes of the attributes of the application object. The accessible attributes of the application object can be provided. The data of the application can be provided to the LLM using the application object access layer. The application object access layer can be used to read the data either by a "large language model" directly using a "plug-in" in a callback fashion, or by using an application code, which can create the content for the "prompts" which are sent to the model. The application object access layer can be configured per LLM domain, by the provider (vendor) for each application object individually, specifying nodes and attributes which are accessible. Since in an enterprise resource planning application, multiple domains can be managed, and several different LLMs can be specialized to particular domains, the application object access layer can be configured per domain, to determine which application objects (AO) access can be granted.

Addressing the challenges of evolving domain particular large language models, the attribute access control protocol described in the present disclosure enables configuration of user access levels and privacy demands for application objects and their respective attributes. A subset of the application objects of an application can be defined as being relevant for a particular LLM domain. Individual nodes and attributes of an AO have different sensitivity levels. A fine-grained access management, configurable per LLM domain and even per LLM service (in case several services are connected for the same domain, handling different sections of the complete data set) are configurable by system administrators, in addition to pre-defined defaults defined by the software vendor for well-known LLM service providers and their respective policies.

An advantage of the implementations described in the present disclosure is that they provide access to application data by LLMs in a transparent way, using an access configuration that can be extended or restricted depending on the model privacy policy. Configurations can define which attribute values and ranges are usable and accessible by particular models, which allows to define different models for the same domain, the different models corresponding to different target groups (e.g., regions). The access configurations can be pre-defined by users (e.g., software vendors), and are changeable by the users of the application, without modifications to application code.

Another advantage of the described technology is that it provides user access rights for database objects or by creating projection views or other data access control techniques. Configurations can be defined per application object or database table. The configurations can be re-usable for access by many LLMs, but the configuration can be adjusted to particular LLMs. The mechanism can case access management and reduce time, effort, delay for maintenance in case LLM terms and conditions change. Furthermore, the described data access control approach allows logging access by LLM to the granted data and blocked access attempts. The access log includes granted access and rejected access requests for individual models that can be analyzed (by developers and system administrators) to optimize access settings, to optimize LLM use, or to optimize other aspects of the application with superior insight into actual access statistics in production use. For example, if an LLM request data outside of application objects configured to be accessed, the requested information can be used to optimize the application setup. The access level can also be correlated to user satisfaction feedback on the quality of the application with respect to particular queries (collected in the access log and correlated). The access logs enable entities to gain transparency about the amount of data and which data elements are accessed by each LLM, which can be used as a selection criterion of one model over another. Selection of particular models can maximize the respective data access control performances. Moreover, collaboratively training the model versions can reduce configurations rearchitecting, while promoting optimal performance of evolving LLMs. Other advantages of the data access control techniques are described with reference to FIGS. 1-6.

Figure 1:
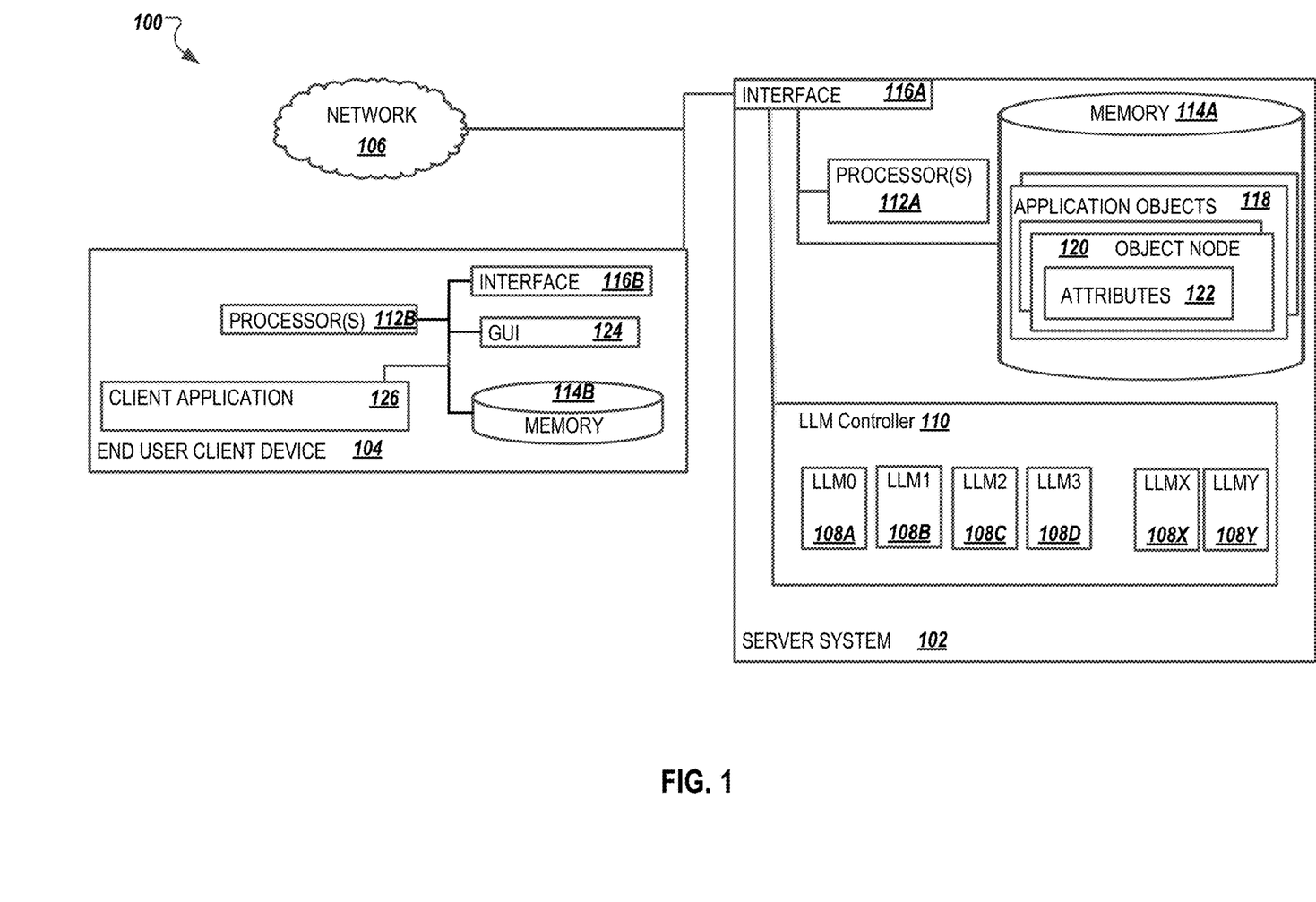
FIG. 1 is a block diagram of an example system that can be used to execute implementations of the present disclosure.

FIG. 1 is a block diagram illustrating an example system 100 for data access control for LLMs. Specifically, the illustrated example system 100 includes or is communicably coupled with a server system 102, an end-user client device 104, and a network 106. Although shown separately, in some implementations, functionality of two or more systems or servers can be provided by a single system or server. In some implementations, the functionality of one illustrated system, server, or component can be provided by multiple systems, servers, or components, respectively.

In the example of FIG. 1, the server system 102 is intended to represent various forms of servers including, but not limited to a web server, an application server, a proxy server, a network server, and/or a server pool. In general, server systems 102 accept requests for application services and provides such services to any number of end-user client devices 104 (e.g., the client device 104 over the network 106). In accordance with implementations of the present disclosure, and as noted above, the server system 102 can host a solution environment that can be a cloud environment providing software applications, systems, and services that can be consumed by customers as a service. In some instances, the server system 102 can support configuring of various LLMs 108A-108Y for users (tenants) of different types that are selectable through an LLM controller 110. The server system 102 includes a processor 112A, a memory 114A, and an interface 116A. The memory 114A can include application objects 118, each application object 118 including one or more object nodes 120, each object node 120 including one or more attributes 122. Particular portions (object nodes 120 and attributes 122) are accessible by LLMs 108A-108Y according to data access configurations.

The end-user client device 104 can be communicatively coupled to the server system 102, through the network 106. In some implementations, the network 106 can include a large computer network, such as a local area network (LAN), a wide area network (WAN), the Internet, a cellular network, a telephone network or an appropriate combination thereof connecting any number of communication devices, mobile computing devices, fixed computing devices and server systems. Data exchanged over the network 106, is transferred using any number of network layer protocols, such as Internet Protocol (IP), Multiprotocol Label Switching (MPLS), Asynchronous Transfer Mode (ATM), and Frame Relay. Furthermore, in implementations where the network 106 represents a combination of multiple sub-networks, different network layer protocols are used at each of the underlying sub-networks. In some implementations, the network 106 represents one or more interconnected internetworks, such as the public Internet.

The end-user client device 104 can be any computing device operable to connect to or communicate in the network(s) 106 using a wireline or wireless connection. In general, the end-user client device 104 includes an electronic computer device operable to receive, transmit, process, and store any appropriate data associated with the system 100 of FIG. 1. The end-user client device 104 is generally intended to encompass any client computing device such as a laptop/notebook computer, wireless data port, smart phone, personal data assistant (PDA), tablet computing device, one or more processors within these devices, or any other suitable processing device. The client device 104 includes interface(s) 116B, processor(s) 112B, memory 114B, and graphical user interface 124A. The end-user client device 104 can include one or more client applications 126. The client application 126 can be any type of application that allows a client device to request and view content on the client device (e.g., generate a request for using a particular LLM 108 to control data access). In some implementations, a client application 126 can use parameters, metadata, and other API and event dependency information received at launch to access a particular LLM 108 from the server system 102. In some instances, a client application 126 can be an agent or client-side version of the one or more enterprise applications running on an enterprise server (not shown). For example, the end-user client device 104 can include a computer that includes an input device, such as a keypad, touch screen, or other device that can accept user information, and an output device that conveys information associated with the operation of the server system 102, or the client device itself, including digital data, visual information, or a GUI 124, respectively.

The GUI 124 can interface with at least a portion of the system 100 for any suitable purpose, including generating a visual representation of the client application 126 or the application 126, respectively. In particular, the GUI 124 can be used to view and navigate various Web pages. Generally, the GUI 124 provides the user with an efficient and user-friendly presentation of data provided by or communicated within the system 100. The GUI 124 can include multiple customizable frames or views having interactive fields, pull-down lists, and buttons operated by the user. The GUI 124 can include any suitable graphical user interface, such as a combination of a generic web browser, intelligent engine, and command line interface (CLI) that processes information and efficiently presents the results to the user visually.

Each processor 112A, 112B included in the server system 102 or the end-user client device 104 can be a central processing unit (CPU), an application specific integrated circuit (ASIC), a field-programmable gate array (FPGA), or another suitable component. Generally, each processor 112A, 112B included in the server system 102 or the end-user client device 104 executes instructions and manipulates data to perform the operations of the server system 102 or the end-user client device 104, respectively. Specifically, each processor 112A, 112B included in the server system 102 or the end-user client device 104 executes the functionality required to process/send requests to access attributes of an application object. Each processor 112A, 112B can be a central processing unit (CPU), a blade, an application specific integrated circuit (ASIC), a field-programmable gate array (FPGA), or another suitable component. Each processor 112A, 112B executes instructions and manipulates data to perform the operations of the respective system. Specifically, each processor 112A, 112B executes the functionality required to receive and respond to requests from the respective system (the server system 102, the end-user client device 104), for example.

Interfaces 116A, 116B are used by the server system 102 and the end-user client device 104, respectively, for communicating with other systems in a distributed environment—including within the system 100—connected to the network 106. Generally, the interfaces 116A, 116B each include logic encoded in software and/or hardware in a suitable combination and operable to communicate with the network 106. More specifically, the interfaces 116A, 116B can each include software supporting one or more communication protocols associated with communications such that the network 106 or interface's hardware is operable to communicate physical signals within and outside of the illustrated system 100.

The memory 114A, 114B can include any type of memory or database module and can take the form of volatile and/or non-volatile memory including, without limitation, magnetic media, optical media, random access memory (RAM), read-only memory (ROM), removable media, or any other suitable local or remote memory component. The memory 114A, 114B can store various objects or data, including caches, classes, frameworks, applications, backup data, application objects, jobs, web pages, web page templates, database tables, database queries, repositories storing application data and/or dynamic information, and any other appropriate information including any parameters, variables, algorithms, instructions, rules, constraints, or references thereto associated with the purposes of the server system 102 and the end-user client device 104, respectively.

There can be any number of end-user client devices associated with, or external to, the system 100. Additionally, there can also be one or more additional client devices external to the illustrated portion of system 100 that are capable of interacting with the system 100 using the network(s) 106. Further, the term "client," "client device,"

and "user" can be used interchangeably as appropriate without departing from the scope of the disclosure. Moreover, while client device can be described in terms of being used by a single user, the disclosure contemplates that many users can use one computer, or that one user can use multiple computers. As used in the present disclosure, the term "computer" is intended to encompass any suitable processing device. For example, although FIG. 1 illustrates a single server system 102 and a single end-user client device 104, the system 100 can be implemented using a single, standalone computing device, two or more servers 102, or multiple client devices. The server system 102 and the end-user client device 104 can include any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server system 102 and the end-user client device 104 can be adapted to execute any operating system or runtime environment, including Linux, UNIX, Windows, Mac OS®, Java™, Android™, iOS, BSD (Berkeley Software Distribution) or any other suitable operating system. According to one implementation, the server system 102 can also include or be communicably coupled with an e-mail server, a Web server, a caching server, a streaming data server, and/or another suitable server.

Regardless of the particular implementation, "software" can include computer-readable instructions, firmware, wired and/or programmed hardware, or any combination thereof on a tangible medium (transitory or non-transitory, as appropriate) operable when executed to perform at least the processes and operations described herein. Indeed, each software component can be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software can instead include multiple sub-modules, third-party services, components, libraries, and such, as appropriate. Conversely, the features and functionality of various components can be combined into single components as appropriate.

In some implementations, an application using LLMs 108 can be developed and tested with particular LLM instance versions 108A-108Y for different LLM domains. The test results can be processed to select LLM instance versions 108A-108X working best (e.g., generating lowest number of errors) with the application. The selected LLM instance versions 108A-108X can be provided with the application upon initial release. Development teams (accessing user devices 104) can identify a portion of the selected LLMs 108A-108D that satisfy a set of terms and conditions provided by an entity (e.g., vendor). LLMs 108A-108D can be run in the memory 114 of the server system 102, and the data being sent to the model can be controlled by the server system 102 of an application vendor. In some implementations, an application development can configure that the application can send also more sensitive (like person related) data. LLMs 108A-108Y can be configured to be provided by a user device 104 of a third-party vendor. If an LLM 108A is received from a user device 104 of a third-party vendor, the development team (accessing another user device 104) can analyze the terms and conditions. If the provider of a model is guaranteeing data privacy, the development team can approve transmission of particular sensitive data. If the provider of a model states that sent data is used to train a subsequent version of a model, the development team can select to use the model, but constrain access to data, which is typically considered "public" by the users of the application (e.g., catalog entries, or application documentation, frequently asked questions, or product marketing material). The LLM configuration can be deployed as data in the configuration tables that map each LLM 108A-108Y to a respective domain LLM-filter-configuration. The LLM controller 110 can include a LLM Application Object Access Layer (LAOAL). The LAOAL of the LLM controller 110 can be configured for a set of different LLMs 108A-108Y, each being configured to access a particular data set (including selected accessible object nodes 120 and attributes 122). The LAOAL of the LLM controller 110 can be connected to the interface 116A called by the interface 116B of the user device 104 that specifies for which LLM 109A, 108B, or 108Y the data is being read. The LAOAL of the LLM controller 110 reads data from memory 114A using a respective "filter", ensuring that only allowed application objects 118, nodes 120, and attributes 122 are read and exposed. Further details regarding the data access control are described in detail with reference to FIGS. 2-6.

Figure 2:
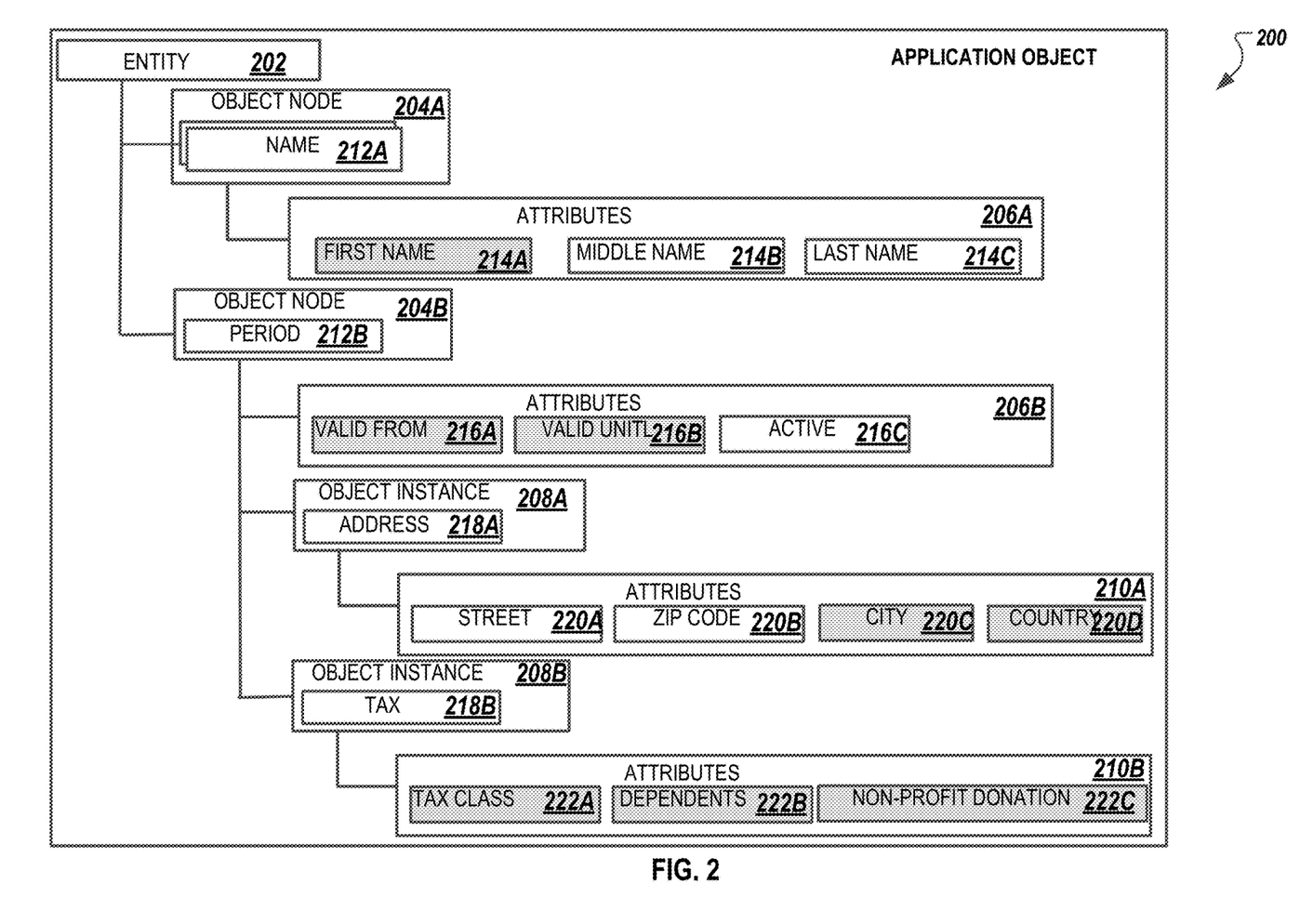
FIG. 2 depicts a schematic diagram illustrating an example of an application object accessible by large language models, in accordance with some example embodiments.

To further illustrate, FIG. 2 depicts a schematic diagram illustrating an example application object 200 (e.g., application object 118 described with reference to FIG. 1) that can be accessed by a large language model (e.g., LLM 108A-108Y described with reference to FIG. 1), in accordance with some example embodiments. The example application object 200 illustrated in FIG. 2 is provided according to a format used by a human resource department of an organization that can have multiple entities associated to it, the application objects defining personal data of the associated entities. Even though the example application object 200 illustrated in FIG. 2 is described in the context example of the human resource department of an organization, the application objects can be formatted according to any department of the organization. The example application object 200 can be associated to an entity 202. The example application object 200 can include multiple object nodes 204A, 204B. Each of the object nodes 204A, 204B includes multiple attributes 206A, 206B. One or more of the object nodes 204B can include one or more object instances 208A, 208B. The object instances 208A, 208B include respective attributes 210A, 210B.

The entity 202 can be identified using an entity (employee or consumer) identifier. The identifier can include an alpha-numeric identifier (including an identifier of the entity type relative to an organization entity, such as the employer of the employee). The object nodes 204A, 204B can include a name 212A and/or a period 212B. The attributes 206A, 206B can be formatted according to their respective object node 204A, 204B. For example, attributes 206A corresponding to the object node 204A including the name 212A can include a first name 216A, a middle name 216B, and a last name 216C. The attributes 206B corresponding to the object node 204B including the period 212B can include a valid from 216A, valid until 216B, and active status 216C. The object instances 208A, 208B. The object instances 208A, 208B can include address 218A, and tax information 218B. The attributes 210A, 210B can be formatted according to their respective object instance 208A, 208B. For example, attributes 210A corresponding to the object instance 208A including the address 218A can include a street name 216A, a zip code 220B, a city name 220C, and a state/country name 220D. The attributes 210B corresponding to the object instance 208B including the tax 218B can include a tax class 222A, dependents 222B, and non-profit donation 222C.

Within the context example illustrated in FIG. 2, a particular LLM can be configured to be granted access to a first portion of the attributes (first name attribute 214A) of the object node 204A and can be prevented from accessing a second portion of the attributes (middle and last name attributes 214B, 214C) of the object node 204A. The LLM can be configured to be granted access to a first portion of the attributes (valid from 216A and valid until 216B) of the object node 204B and can be prevented from accessing a second portion of the attributes (active status 216C 214B, 214C) of the object node 204B. The LLM can be configured to be granted access to a first portion of the attributes (city 220C and country 220D) of the object instance 208A and can be prevented from accessing a second portion of the attributes (street 220A and zip code 220B) of the object instance 208A. The LLM can be configured to be granted access to all attributes 210B of the object instance 208B. The selection of the accessible attributes per object node and instance can be independent from each other, such that a portion of (or all) attributes of an object node or object instance can be accessible, while a portion of (or all) attributes of another object node or object instance can be inaccessible for the particular LLM. An access configuration for the LLM can be updated at any time, such that access to any of the attributes by the LLM can be modified (switched from accessible to inaccessible or vice versa).

Figure 3:
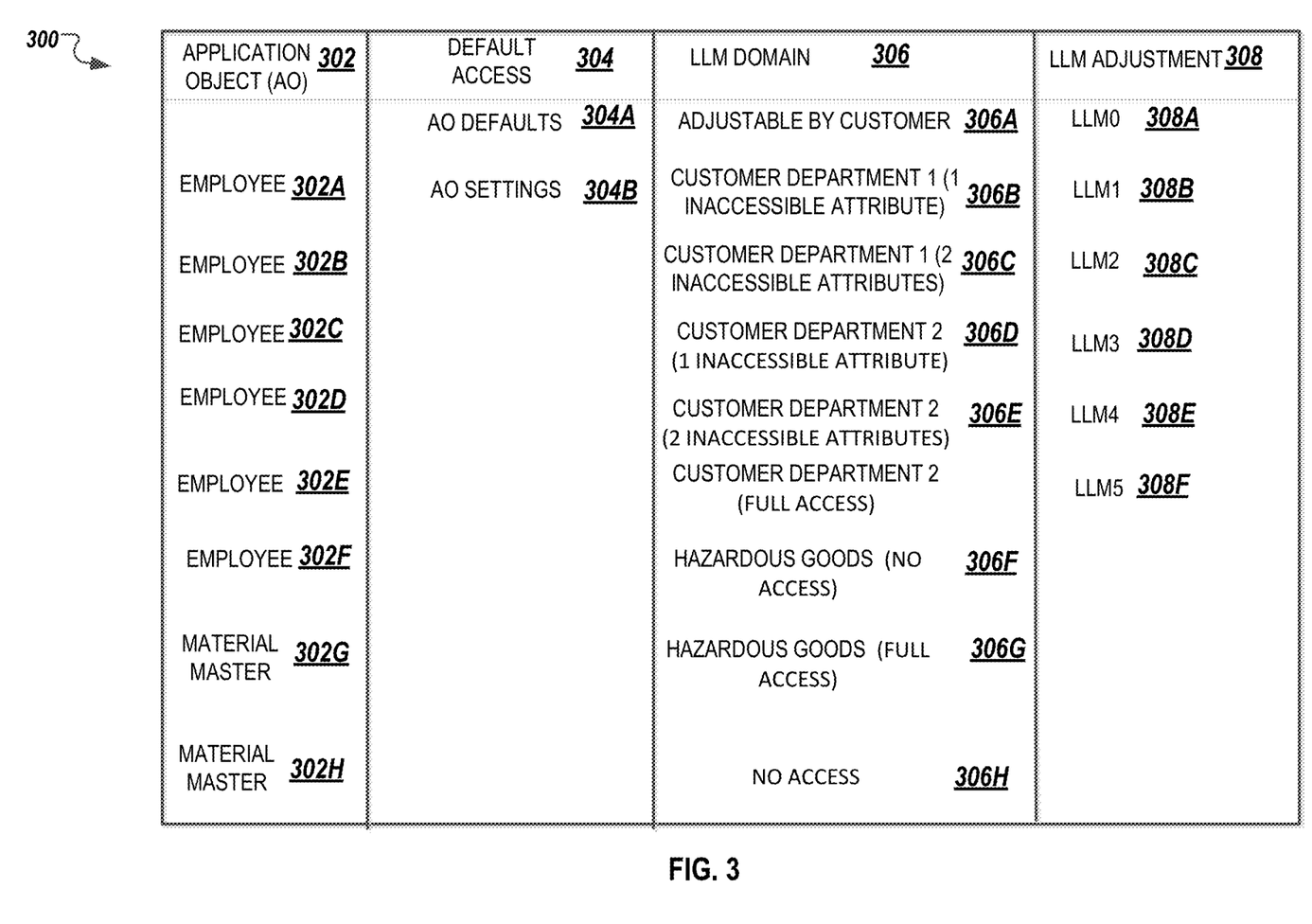
FIG. 3 depicts a schematic diagram illustrating an example of a filter configuration for large language models adjustments, in accordance with some example embodiments.

FIG. 3 depicts a schematic diagram illustrating an example of a filter configuration 300 for large language models adjustments. In particular, FIG. 3 depicts a filter configuration 300 that can define data access control based on application objects 302, default access definitions 304, applicable LLM domains 306, and implemented LLM adjustments 308. The example filter configuration 300 illustrated in FIG. 3 is provided according to a format applicable to multiple domains 306 that can correspond to departments of an organization (e.g., a human resource department, customer department, hazardous goods) or categories of data stored by an organization that can have multiple entities associated to it. The application objects can define personal data of entities associated to the organization and/or items produced and/or handled by the organization. The example filter configuration 300 can include multiple application objects 302A-302H, for which the access filter can be set to standard default values 304A or customizable settings 304B. Each of the LLM domain 306A-306H can be associated to a particular LLM adjustment 308 of a particular LLM 308A-308F. For example, a subset of the application objects 302A-302H can be identified as relevant for a particular LLM domain 306A-306H. The example filter configuration 300 can reflect different sensitivity levels of individual nodes and attributes of the application objects 302A-302H. Adjustable access management includes configuring the LLM domain and the LLM service (in case several services are connected for the same domain, handling different sections of the complete data set) by system administrators, in addition to pre-defined defaults 304A defined by the software vendor for well-known LLM service providers and their respective policies.

Figure 4:
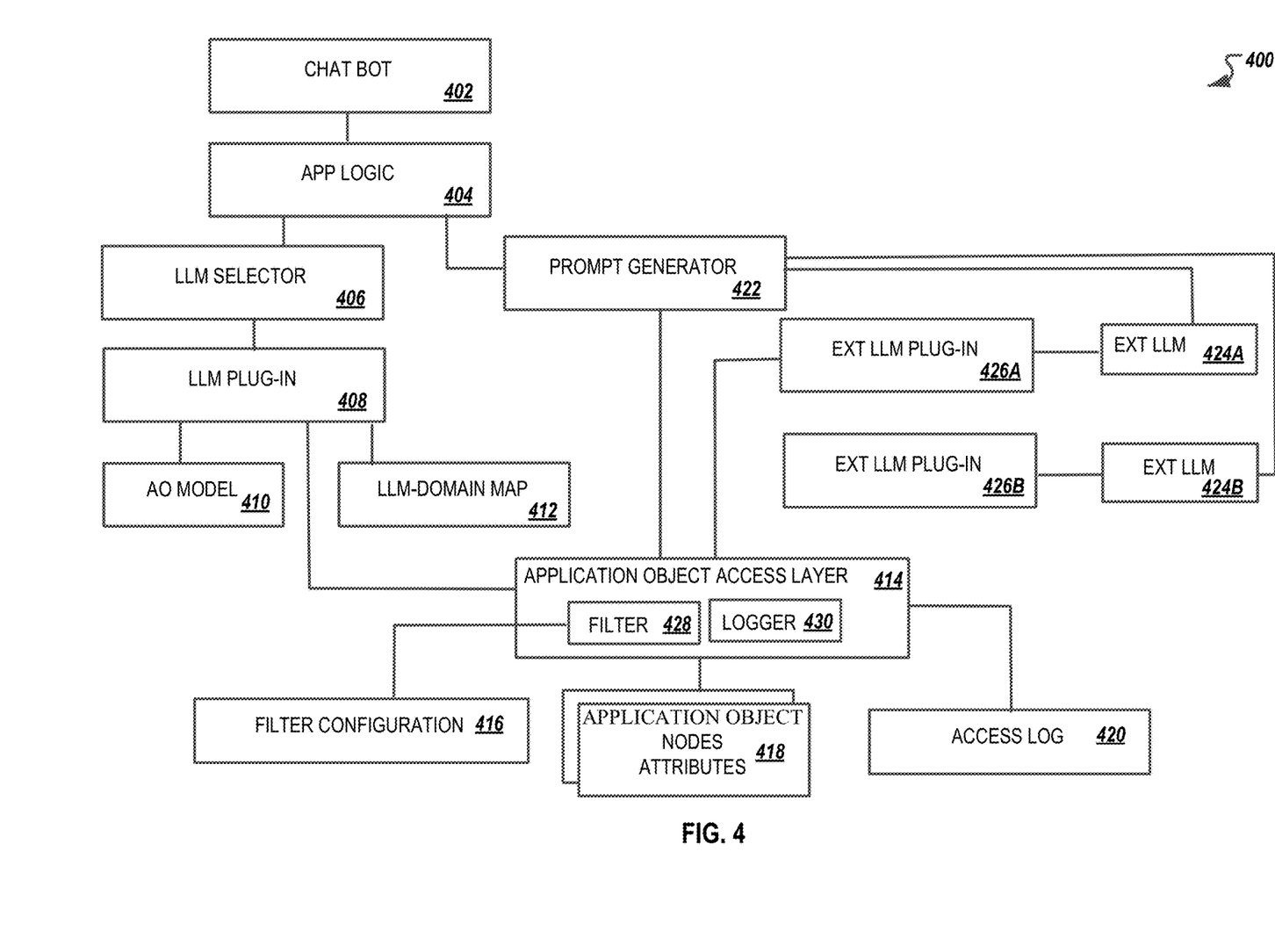
FIG. 4 depicts a schematic flow diagram illustrating an example architecture for data access control for applications using large language models, in accordance with some example embodiments.

FIG. 4 depicts a schematic example architecture 400 configured to provide data access control for applications using large language models (e.g., LLM 108A-108Y described with reference to FIG. 1 and LLM 308A-308F described with reference to FIG. 3). The schematic example architecture 400, includes a chat bot 402, an application logic 404, a LLM selector 406, a LLM plug-in 408, an application object model 410, a LLM domain map 412, an application object access layer 414, a configuration filter 416, an application object 418, an access log 420, a prompt generator 422, one or more external LLMs 424A, 424B, and respective one or more external LLM plug-ins 426A, 426B.

The chat bot 402 is configured to execute an automated process in response to a user input received from a user device. For example, the user input can include a question for the application chat bot 402 (e.g., the question can be about legal regulations regarding retirement or pension terms for one employee). The chat bot can include a machine learning model trained to perform a question answering task. In some example embodiments, the machine learning model can be subjected to supervised pre-training, for example, to perform a question answering task before the machine learning model is fine-tuned to perform the question generation task. The chat bot 402 can include a machine learning controller that can collaboratively train the machine learning model to perform a question generation task including by adjusting one or more weights applied by the first machine learning model generating one or more questions in order to minimize an error in an output of the machine learning model. In some example embodiments, once the first machine learning model is pre-trained to perform the question answering task, the machine learning model can still require fine-tuning in order to perform a question generation task. The fine-tuning can include the machine learning model 115a performing the question generation task to generate one or more questions, which are then answered by performing the question answering task. For example, the weights applied by the first machine learning model can be adjusted through backpropagation of the error (or another optimization technique) present in the output of the machine learning model. Alternatively, and/or additionally, the trained machine learning model can be deployed, for example, to the natural language processing engine in order to perform a question generation task and/or a question answering task associated with the natural language processing application. For example, the natural language processing engine can receive, from the client user device, a request to perform a natural language processing task for accessing data associated to an employee. In response to the request, the natural language processing engine can apply the machine learning model to generate a query executable by the application logic 404 configured to answer a question.

The chat bot 402 can send the query to the application logic 404 for processing. For example, an application embedded in a computing system hosting the chat bot 402, can be used to interpret the question before it is sent to a matching external LLM service, including the right data needed in the context of the question. The chat bot 402 queries the internal application logic 404 to analyze the user question. the internal application logic 404 can send the analysis results to an LLM selector 406 to determine, which configured LLMs to be queried to answer the user question. The LLM selector 406 can include or be coupled to the LLM plug-in 408 that has access to the application object model 410 and can map the question to application object types (e.g., an "employee") of the questions data domain (e.g., "human resources") using the LLM domain map 412.

The LLM selector 406 has access to the application object instances 418 through the LAOAL 414 that includes a filter 428 and a logger 430. The LLM selector 406 can query for more information for entities mentioned in the question (e.g., query for information of the mentioned employee, like in which country the employee residing (let's assume it is "EU") or which jurisdiction is relevant for the particular employee).

The LAOAL 414 reads the configuration and transmits access information for storage in the access log 420. The LLM selector 406 can access the LLM-domain-map 412 (e.g., configuration tables that map each LLM to a respective domain LLM-filter-configuration) to determine the domain of the question and to select a suitable configured external LLM 424A, 424B. For example, applicable rules and laws (e.g., "labor law") of a respective domain are identified. The LLM selector 406 can select a model instance relevant for employees in a particular jurisdiction (e.g., "U.S.A." or "E.U."). The LLM selector 406 returns the information to the application logic 404. The returned information includes a recommendation to use the identified suitable configured external LLM 424A, 424B for the identified domain "labor law", the identified attribute value "EU", for the identified employee "John Doe." The application logic 404 transmits the request to the prompt generator 422.

The application logic 404 generates a query for the application object instance using the required information to generate, using the prompt generator 422, the prompt (e.g., additional relevant attributes about employee "John Doe"). The prompt generator 422 can access the application object using the LAOAL 414, specifying that the information is for the external LLM 424A, 424B. The LAOAL 414 is provided with the information, that the data access is to be evaluated for the external LLM 424A, 424B. The LAOAL 414 queries the LLM filter configuration 416. The LLM filter configuration 416 is read in a "layered" fashion: First the default configuration for the application object is read. Potential entries for the LLM domain are read from the LLM filter configuration 416, which overwrite the default (e.g., domain "labor law"). A potential configuration for the external LLM 424A, 424B is read, which can overwrite the LLM domain settings. The LAOAL 414 writes an entry to the access log 420, that for a model of the external LLM 424A, 424B a query has been received. The entry in the access log 420 can also include, which attributes have been provided and which have been rejected. The LAOAL 414 reads the data considering the access constraints read from the LLM filter configuration 416 and sends the data back to the prompt generator 422. The prompt generator 422 passes the created prompt (including the retrieved data from the LAOAL 414 to the application logic 404.

The application logic 404 calls the identified external LLM 424A, 424B. The application logic 404 calls the configured external LLM 424A, 424B and sends the generated prompt and potentially, the initial question by the user. For example, a processed or a cleaned or a normalized variant of the question can be sent.

The external LLM 424A, 424B can optionally, if configured and required, calls the external LLM plug-in 426A, 426B provided by the application for the model. The model can create a query and send the query to the respective external LLM plug-in 426A, 426B. The external LLM plug-in 426A, 426B queries data from the LAOAL 414. The LAOAL 414 reads the filter configuration, writes access log and retrieves data. The respective external LLM plug-in 426A, 426B can provide the read data to the respective external LLM 424A, 424B. The external LLM plug-in 426A, 426B can compute the response and can send the response to the application logic 404, which derives an action to be executed or response to be sent to the user device, which had submitted the question.

Figure 5:
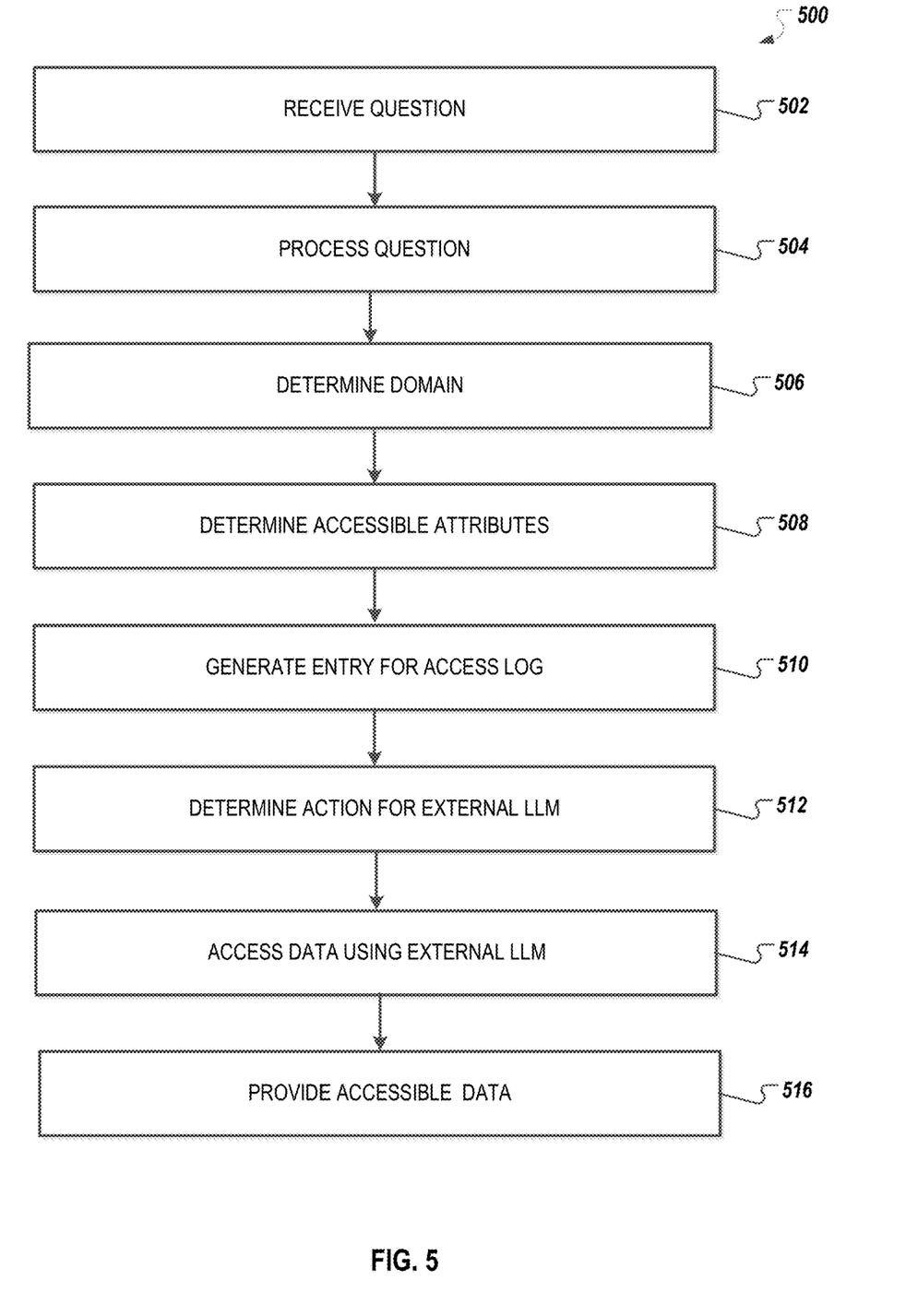
FIG. 5 depicts a flowchart illustrating an example process for data access control for applications using large language models, in accordance with some example embodiments.

FIG. 5 depicts a flowchart illustrating an example process 500 for data access control for applications using large language models, in accordance with some example embodiments. Referring to FIGS. 1 and 4, the process 500 can be performed by any components of the example system 100 and/or example architecture 400.

At 502, a question is received. The question can be provided as a user input to a chat bot. The question can include a request for conditions (e.g., legal regulations, law and employer conditions) regarding a status (e.g., vacation, medical leave, extended leave, retirement or pension terms) for one employee (identified using an identifier such as a name or an employee number) of an entity (e.g., an employer having multiple employees).

At 504, the question is processed to interpret the question based on a context of the question, to generate an application processable query. The question is processed using a machine learning model configured to perform a question answering task. The machine learning model can include a machine learning model pre-trained and fine-tuned to perform the question answering task.by interpreting the question to determine the context of the question and to generate the application processable query.

At 506, a questions data domain is determined by accessing an identified application object model and by mapping the question, based on its context, to application object types (e.g., an "employee") of the question data domain. The question data domain can correspond to a department and/or a section of the entity (e.g., "human resource department").

At 508, accessible attributes are determined by querying, the LLM object access layer. The LLM object access layer includes a filter configured to determine the accessible attributes using a filter configuration. The LLM object access layer accesses a prompt generator to create a content for prompts sent to an external LLM to retrieve the accessible attributes. The configuration provided by the application vendor defines application objects and attributes, which can be accessed by particular LLMs. The configuration is based on the vendor assessment of data privacy of a typical customer of the application. The configuration can include policies of entities (e.g., companies and organizations) defining how data access can be accessed. For example, the configurations can be adjusted to include the constraints of the company accessing application objects. Configuration defining data accessing levels can be different between entities. For example, catalog entries can be defined as "public" entries for some entities and for other entities, catalog entries can be "internal" entries. The configuration can be adjustable to define the access (or choose to use a different LLM provider, see below "customer extensions") level to entries of each entity.

Different application versions can have different application objects that can be updated together with the LLM-domain-map and the respective LLM filter configuration. The LLM-filter configuration can define access to application object content. The LLM-filter configuration can be configured for LLM domains or individual LLMs. The LLM-filter configuration can be done per application object type, application object node, and attribute. The LLM-filter configuration can constrain access to application objects with particular attribute values. The LLM-filter configuration can be defined in a "multi-layer" approach. A "default access" layer specifies, which nodes and attributes of an application object type can be accessed (by LLMs in general). A "LLM domain" layer specifies (for LLM domains), which application objects can be accessed, and the nodes and attributes that can be overwritten compared to the "default access" layer. A "LLM instance" layer indicates particular LLMs that can be configured to belong to a "domain" defined in the "LLM domain" layer. "LLM instance" layer indicates which AOs (and which of the respective nodes and attributes) can be accessed compared to the "default access" layer. Customers using the application can add an additional "LLM instance" and overwrite the "default access" or potential "LLM domain" layers.

New LLM versions can be specified (by a development team) to update access to application objects and its attributes and provide updated data in the LLM-domain-map and LLM-filter-configuration to the users of the application either by deploying to the software as service application or by providing a "priority patch" for applications being deployed on customer computers. The LLM-domain-map specifies, which data domains an LLM is configured for. If a query is received, the query can be analyzed, which data domain matches and the respective model can be read from the map and further-on used to send the query to. The LLM-domain map can constrain an LLM to usage for particular application objects based on the respective attribute values. The LLM-domain map enables more than one model to be specified for the same domain, but for different attribute values. For example, different models can be defined for different regions, materials or according to other attribute properties.

Applications can enable implementation of (customer) extension options. For example, customized fields can be added to application objects, new objects can be created and customized processes can also be added. In the context of generative artificial intelligence, the mapping to customized applications can be customized to call LLMs customized by the entity issuing the question or LLMs customized by third party providers, which had not been considered by the vendor of the application. The customized LLMs can include entries corresponding to the LLM-domain-map and LLM-filter-configuration, specifying to which application objects and attributes access can be granted for the individually configured LLMs.

At 510, an entry in an access log is generated. The entry in the access log indicates the accessible attributes determined for the context of the question. The access log can record successful access of LLMs to data and can log rejected access attempts. The access log can be processed with user feedback on the quality of the application with respect to particular queries, to optimize the application and create a newer version, with an adjusted (changed) configuration indicative of a selection of LLM and data access. The LLMs can include a lifecycle. New versions of models can be provided with changed terms and conditions. Additionally, the development team might come to a different assessment on the privacy statements regarding a particular model. It is thus mandatory, that the application can be adjusted quickly to new situations.

At 512, an action to be executed in response to determining the accessible attributes is determined. The action can include generating an executable query for the application to query the application object instance for the required information to generate the prompt (e.g., additional relevant attributes about employee "John Doe"). The executable query can be generated using a prompt generator configured to access the application object using the LLM object access layer. The executable query can specify that the information is for an external LLM. The action can include providing the LLM object access layer with the information, that the data access is to be evaluated for the external LLM. The action can include triggering the LLM object access layer to query the external LLM-filter-configuration for reading potential entries for the external LLM domain, which can overwrite the LLM domain settings. The action can include writing an entry to the access log that for an external model LLM a query has been received and which attributes have been provided and which have been rejected. The action can include reading the data considering the access constraints read from the LLM-filter-configuration and sending the data back to the prompt generator. The prompt generator passes the created prompt (including the retrieved data from the LLM object access layer to the application. The LLMs can be called with "system message" and prompt the content for "system message." The prompt can depend on the query. The prompt can be enriched with application data (especially if no plug-in is provided).

At 514, accessible data is accessed using the LLM to generate a response (e.g., a text responsive to the received question). The prompt generator reads data using LLM object access layer. The LLM object access layer can restrict access to data, configured for the respective LLM. The LLM is provided the endpoint to the generated API for access. The accessible data can be accessed, by the plug-in of the selected LLM, configured for reading accessible data using the LLM object access layer.

At 516, a response based on the accessible attributes of the application object are provided, for display, to the user device. For example, the plug-in of the external LLM can provide the read data to the selected (internal or external) LLM. The selected (internal or external) LLM computes the response and sends the response to the application. The application derives an action to be executed. The action can include sending a response to the user device, which submitted the question. In some implementations, a feedback based on the displayed response to the initial question is automatically requested. The feedback can indicate an approval level of the response and can be used for further training the machine learning model.

The example process 500 allows configuring the access to application data by LLMs in a transparent way. Configurations can be pre-defined by the software vendor, and are changeable by the users of the application, without modifications to application code, access rights for database objects or by creating projection views or another technique. Configurations can be defined per application object and/or database table, the configuration being re-usable for access by many LLMs, but the configuration can be adjusted to particular LLMs. The example process 500 can case access management and reduce costs for maintenance in case LLM terms and conditions change. Furthermore, the example process 500 allows logging access by LLM to the granted data and blocked access attempts, which allows automatically triggered optimization of access settings, continuous fine tuning of the machine learning models, and optimization of LLM use with improved insight into actual access statistics in production use.

Figure 6:
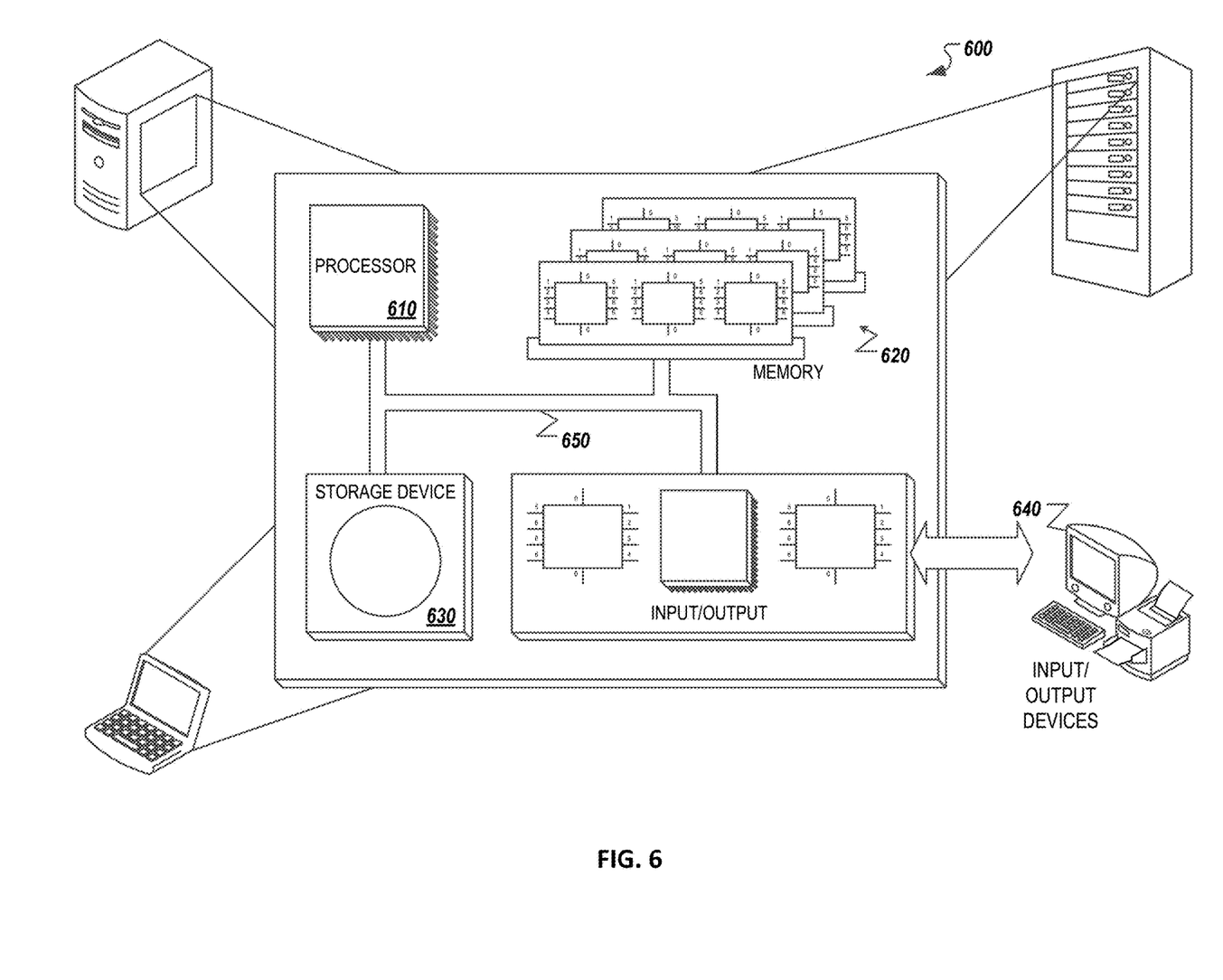
FIG. 6 depicts a block diagram illustrating a computing system, in accordance with some example embodiments.

FIG. 6 depicts a block diagram illustrating a computing system 600, in accordance with some example embodiments. Referring to FIG. 1, the computing system 600 can be used to implement the LLM controller 110 and/or any components of the example system 100.

As shown in FIG. 6, the computing system 600 can include a processor 610, a memory 620, a storage device 630, and input/output devices 640. The processor 610, the memory 620, the storage device 630, and the input/output devices 640 can be interconnected using a system bus 650. The processor 610 is capable of processing instructions for execution within the computing system 600. Such executed instructions can implement one or more components of, for example, the LLM controller 110, described with reference to FIG. 1. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided using the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some implementations of the current subject matter, the computing system 600 can be used to execute various interactive computer software applications that can be used for organization, analysis and/or storage of data in various (e.g., tabular) format (e.g., Microsoft Excel®, and/or any other type of software). Alternatively, the computing system 600 can be used to execute any type of software applications. These applications can be used to perform various functionalities, e.g., planning functionalities (e.g., generating, managing, editing of spreadsheet documents, word processing documents, and/or any other objects), computing functionalities, or communications functionalities. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided using the input/output device 640. The user interface can be generated and presented to a user by the computing system 600 (e.g., on a computer screen monitor).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random-access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although the disclosure has been described in terms of certain implementations and generally associated methods, alterations and permutations of these implementations, and methods will be apparent to those skilled in the art. Accordingly, the above description of example implementations does not define or constrain the disclosure. Other changes, substitutions, and alterations are also possible without departing from the spirit and scope of the disclosure.

A number of implementations of the present disclosure have been described. Nevertheless, it will be understood that various modifications may be made without departing from the spirit and scope of the present disclosure. Accordingly, other implementations are within the scope of the following claims.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: receiving, by one or more processors from a user, a request to access attributes of an application object; determining, by the one or more processors, a large language model (LLM) object access layer defining an access level of the user to each attribute of the application object; querying, by the one or more processors, the LLM object access layer, to determine accessible attributes of the attributes of the application object; and providing, by the one or more processors, a response based on the accessible attributes of the application object to the user.

Example 2. The computer-implemented method of example 1, wherein the LLM object access layer comprises a filter configured to determine the accessible attributes using a filter configuration.

Example 3. The computer-implemented method of any of the preceding examples, wherein the LLM object access layer accesses a prompt generator to create a content for prompts sent to an external LLM to retrieve the accessible attributes.

Example 4. The computer-implemented method of any of the preceding examples, further comprising: interpreting, by the one or more processors, a question, using an application logic, to determine a context of the question.

Example 5. The computer-implemented method of any of the preceding examples, wherein determining a domain of an LLM configured to access the accessible attributes is based on processing the context of the question.

Example 6. The computer-implemented method of any of the preceding examples, further comprising: applying, by the one or more processors, a filtering configuration corresponding to the context of the question.

Example 7. The computer-implemented method of any of the preceding examples, further comprising: generating, by the one or more processors, an entry in an access log indicating the accessible attributes determined for the context of the question.

Example 8. The computer-implemented method of any of the preceding examples, wherein the LLM comprises a lifecycle comprising time varying terms and conditions.

Example 9. The computer-implemented method of any of the preceding examples, further comprising: determining, by the one or more processors, an action to be executed in response to determining the accessible attributes.

Example 10. The computer-implemented method of any of the preceding examples, wherein the application object comprises object nodes, each node comprising one or more attributes.

Example 11. A computer-implemented system comprising: memory storing application programming interface (API) information; and a server performing operations comprising: receiving, by one or more processors from a user, a request to access attributes of an application object; determining a large language model (LLM) object access layer defining an access level of the user to each attribute of the application object; querying the LLM object access layer, to determine accessible attributes of the attributes of the application object; and providing a response based on the accessible attributes of the application object to the user.

Example 12. The computer-implemented system of example 11, wherein the LLM object access layer comprises a filter configured to determine the accessible attributes using a filter configuration, and wherein the application object comprises object nodes, each node comprising one or more attributes.

Example 13. The computer-implemented system of any of the preceding examples, wherein the LLM object access layer accesses a prompt generator to create a content for prompts sent to an external LLM to retrieve the accessible attributes.

Example 14. The computer-implemented system of any of the preceding examples, wherein the operations further comprise: interpreting a question, using an application logic, to determine a context of the question.

Example 15. The computer-implemented system of any of the preceding examples, wherein determining a domain of an LLM configured to access the accessible attributes is based on processing the context of the question.

Example 16. The computer-implemented system of any of the preceding examples, wherein the operations further comprise: applying a filtering configuration corresponding to the context of the question.

Example 17. The computer-implemented system of any of the preceding examples, wherein the operations further comprise: generating an entry in an access log indicating the accessible attributes determined for the context of the question.

Example 18. The computer-implemented system of any of the preceding examples, wherein the LLM comprises a lifecycle comprising time varying terms and conditions.

Example 19. The computer-implemented system of any of the preceding examples, wherein the operations further comprise: determining an action to be executed in response to determining the accessible attributes.

Example 20. A non-transitory computer-readable media encoded with a computer program, the computer program comprising instructions that when executed by one or more computers cause the one or more computers to perform operations comprising: receiving, by one or more processors from a user, a request to access attributes of an application object; determining a large language model (LLM) object access layer defining an access level of the user to each attribute of the application object; querying the LLM object access layer, to determine accessible attributes of the attributes of the application object; and providing a response based on the accessible attributes of the application object to the user.

What is claimed is:

1. A computer-implemented method comprising:
receiving, by one or more processors from a user device, a request to access attributes of an application object;
determining, by the one or more processors, a large language model (LLM) object access layer defining an access level of the user device to each attribute of the application object, wherein the LLM object access layer is included in a controller, the LLM object access layer comprises a first LLM that is trained by the controller to operate as a prompt generator to create prompts for a second LLM external to the LLM object access layer, wherein the LLM object access layer comprises a filter;

querying, by the one or more processors, the LLM object access layer, to determine accessible attributes of the attributes of the application object that are accessible to the first LLM according to a filter configuration of the filter, wherein the filter configuration is adjustable to apply constraints to the accessible attributes that are accessible by the first LLM and the filter configuration is defined for the application object according to a format applicable to a plurality of domains; and providing, by the one or more processors, by querying the second LLM, using a prompt generated by the first LLM, a response to the request, based on the accessible attributes of the application object that are accessible by the first LLM.

2. The computer-implemented method of claim 1, wherein the filter configuration-is extendable according to a model privacy policy.

3. The computer-implemented method of claim 1, wherein the LLM object access layer accesses a prompt generator to create a content for prompts sent to the second LLM to retrieve the accessible attributes.

4. The computer-implemented method of claim 3, further comprising:
interpreting, by the one or more processors, a question, using an application logic, to determine a context of the question.

5. The computer-implemented method of claim 4, wherein determining a domain of an LLM configured to access the accessible attributes is based on processing the context of the question.

6. The computer-implemented method of claim 4, further comprising:
applying, by the one or more processors, the filter configuration corresponding to the context of the question.

7. The computer-implemented method of claim 4, further comprising:
generating, by the one or more processors, an entry in an access log indicating the accessible attributes determined for the context of the question.

8. The computer-implemented method of claim 1, wherein the first LLM comprises a lifecycle comprising time varying terms and conditions.

9. The computer-implemented method of claim 1, further comprising:
determining, by the one or more processors, an action to be executed in response to determining the accessible attributes.

10. The computer-implemented method of claim 1, wherein the application object comprises object nodes, each node comprising one or more attributes.

11. A computer-implemented system comprising:
memory storing application programming interface (API) information; and
a server comprising: one or more processors; and a non-transitory computer-readable storage medium coupled to the one or more processors and storing programming instructions for execution by the one or more processors, the programming instructions instructing the one or more processors to perform operations comprising:
receiving, by the one or more processors from a user device, a request to access attributes of an application object;

determining, by the one or more processors, a large language model (LLM) object access layer defining an access level of the user device to each attribute of the application object, wherein the LLM object access layer is included in a controller, the LLM object access layer comprises a first LLM that is trained by the controller to operate as a prompt generator to create prompts for a second LLM external to the LLM object access layer, wherein the LLM object access layer comprises a filter;

querying, by the one or more processors, the LLM object access layer, to determine accessible attributes of the attributes of the application object that are accessible to the first LLM according to a filter configuration of the filter, wherein the filter configuration is adjustable to apply constraints to the accessible attributes that are accessible by the first LLM and the filter configuration is defined for the application object according to a format applicable to a plurality of domains; and providing, by the one or more processors, by querying the second LLM, using a prompt generated by the first LLM, a response to the request, based on the accessible attributes of the application object that are accessible by the first LLM.

12. The computer-implemented system of claim 11, wherein the filter configuration is extendable according to a model privacy policy.

13. The computer-implemented system of claim 11, wherein the LLM object access layer accesses a prompt generator to create a content for prompts sent to the second LLM to retrieve the accessible attributes.

14. The computer-implemented system of claim 13, wherein the operations further comprise:
interpreting a question, using an application logic, to determine a context of the question.

15. The computer-implemented system of claim 14, wherein determining a domain of an LLM configured to access the accessible attributes is based on processing the context of the question.

16. The computer-implemented system of claim 14, wherein the operations further comprise:
applying the filter configuration corresponding to the context of the question.

17. The computer-implemented system of claim 14, wherein the operations further comprise:
generating an entry in an access log indicating the accessible attributes determined for the context of the question.

18. The computer-implemented system of claim 11, wherein the first LLM comprises a lifecycle comprising time varying terms and conditions.

19. The computer-implemented system of claim 11, wherein the operations further comprise:
determining an action to be executed in response to determining the accessible attributes.

20. A non-transitory computer-readable media encoded with a computer program, the computer program comprising instructions that when executed by one or more computers cause the one or more computers to perform operations comprising:
receiving, by one or more processors from a user device, a request to access attributes of an application object;
determining, by the one or more processors, a large language model (LLM) object access layer defining an access level of the user device to each attribute of the application object, wherein the LLM object access layer is included in a controller, the LLM object access layer comprises a first LLM that is trained by the controller to operate as a prompt generator to create prompts for a second LLM external to the LLM object access layer, wherein the LLM object access layer comprises a filter;

querying, by the one or more processors, the LLM object access layer, to determine accessible attributes of the attributes of the application object that are accessible to the first LLM according to a filter configuration of the filter, wherein the filter configuration is adjustable to apply constraints to the accessible attributes that are accessible by the first LLM and the filter configuration is defined for the application object according to a format applicable to a plurality of domains; and providing, by the one or more processors, by querying the second LLM, using a prompt generated by the first LLM, a response to the request, based on the accessible attributes of the application object that are accessible by the first LLM.

* * * * *